Patented Apr. 19, 1949

2,467,876

UNITED STATES PATENT OFFICE 2,467,876

PREPARATION OF BETA-ACETOXY-PROPIONIC ACID

Seaver A. Ballard, Orinda, and Bradford P. Geyer and Robert H. Mortimer, Berkeley, Calif., assignors to Shell Development Company, San Francisco, Calif., a corporation of Delaware No Drawing. Application February 15, 1947, Serial No. 728,960

6 Claims. (Cl. 260—491)

This invention relates to a process for the preparation of beta-acetoxypropionic acid, otherwise known as the acetate of hydracrylic acid. More particularly, the present invention relates to a process for the preparation of beta-acetoxypropionic acid by oxidation of beta-acetoxypropionaldehyde, also known as the acetate of hydracrylaldehyde.

The organic compounds with which the present invention is concerned, as reactant and product, respectively, are reactive dicarbonyl compounds that are unique members of the more general classes composed of the substituted aldehydes and the substituted carboxylic acids. They possess unusual characteristics which distinguish them from other known compounds.

It is known to oxidize aldehydes to the corresponding carboxylic acids as by treatment with potassium permanganate, sodium dichromate, hydrogen peroxide and like oxidizing agents. Oxidation of beta-acetoxypropionaldehyde according to such known methods has been found to result in negligible yields of beta-acetoxypropionic acid, apparently because of predominance of undesired side reactions which result in formation of products other than the one desired.

An object of the present invention is a method for the preparation of beta-acetoxypropionic acid. A more particular object of the invention is a method for the oxidation of beta-acetoxypropionaldehyde to produce beta-acetoxypropionic acid. Catalytic oxidation of beta-acetoxypropionaldehyde to the desired acid and catalysts effective for promoting the desired oxidation are still further objects of the invention. Other objects of the invention will become apparent hereinafter.

It now has been discovered, in accordance with the invention, that beta-acetoxypropionaldehyde may be oxidized to produce beta-acetoxypropionic acid in high yields, generally in excess of about 80%, by treatment in the liquid phase with an oxygen-containing gas in the presence of a suitable oxidation catalyst. As the oxidation catalyst there is employed in accordance with the invention a cobalt chelate salt of a beta-diketone, soluble in the reaction medium. The beta-diketones may be defined as those organic compounds which contain two ketonic carbonyl groups in a linear group of atoms, the two carbonyl carbon atoms being connected to the same carbon atom. The cobalt chelate salts of aliphatic beta-diketones may be employed. Cobalt acetylacetonate is particularly efficacious when employed as the catalyst in the process of the invention. Other cobalt chelate salts of beta-diketones may be employed, however, such as the cobalt salts of 2,4-hexanedione, 2,4-heptanedione, 1-cyclohexyl-2,4-hexanedione, 2,4-octanedione, 2-methyl-3,5-hexanedione, and the like.

As the oxygen-containing gas, there may be employed pure oxygen, air, oxygen-enriched air, or gaseous mixtures comprising oxygen and an inert diluent gas such as nitrogen, carbon dioxide, and the like. Pure oxygen is particularly effective, although air may be employed, if desired, with the particular advantage of low cost.

The beta-acetoxypropionaldehyde preferably is dissolved in a suitable substantially anhydrous, acidic, inert organic solvent medium such as glacial acetic acid or a solvent mixture comprising glacial acetic acid and one or more additional organic solvents, e. g., an aliphatic hydrocarbon, an aromatic hydrocarbon, a chlorinated hydrocarbon, an ether, an ester, or a similar organic solvent. Essentially pure glacial acetic acid is a preferred solvent.

Interaction of the beta-acetoxypropionaldehyde and the oxygen may be effected by intimately contacting the oxygen or oxygen-containing gas with the solution of beta-acetoxypropionaldehyde in the presence of the oxidation catalyst. For example, a 10 to 75 per cent, preferably 35 to 60 per cent by weight solution of the beta-acetoxypropionaldehyde, containing from about 0.5 to about 15 per cent, preferably from about 1 to about 5 per cent, based on the weight of the beta-acetoxypropionaldehyde, of cobalt acetylacetonate, may be aerated with the oxygen containing gas as by passing a stream of the gas into and through the solution, or otherwise contacting the gas and the solution of beta-acetoxypropionaldehyde in the presence of the catalyst, for a period of time sufficient to effect the desired oxidation reaction. The temperature desirably is maintained at about 40° C. to about 70° C. The reaction is exothermic. The provision of a suitable cooling means, such as cooling coils, therefore may be desirable, depending upon the size and shape of the reaction vessel, etc. Alternatively, temperature rise may be controlled or prevented by suitable regulation of the rate of aeration.

Approaching completion of the reaction may be recognized by a decrease in the rate of evolution of heat and, when catalysts such as cobalt salts are employed, by a decrease in the intensity of the color of the solution. After termination of the reaction, the beta-acetoxypropionic acid may be recovered as by fractional distillation of the reaction mixture, preferably under pressures below about 5 millimeters of mercury. Other methods of separation may be used if desired, such as treatment with select solvents, conversion of the acid to a salt and crystallization thereof, etc.

A preferred method of carrying out the process of the present invention is illustrated in the following example. It will be understood, however, that the example is not given with the intent to limit unnecessarily the scope of the invention, and that numerous variations from the example can be made without exceeding the scope of the invention as it is defined in the appended claims.

*Example*

Beta-acetoxypropionaldehyde was prepared by heating a mixture of glacial acetic acid and acrolein in a molar ratio of 4.5:1 in a closed, glasslined reaction vessel for four hours at 120° C. The resultant mixture was fractionally distilled. Beta-acetoxypropionaldehyde was recovered as the fraction distilling at 61° C. under a pressure of 8 millimeters of mercury. It was found to have a refractive index ($n_D^{20}$) of 1.4179, a density ($d20/4$) of 1.0783 and a molecular refraction ($M_D^{20}$) of 26.9. The 2,4-dinitrophenylhydrazone of the beta-acetoxypropionaldehyde was prepared and found to have a melting point of 124.5°–125.5° C.

Thirty parts of the beta-acetoxypropionaldehyde thus prepared were dissolved in a solution of about 0.5 part of cobalt acetylacetonate in 50 parts of glacial acetic acid. A stream of oxygen gas was passed into the solution, with agitation, causing an exothermic reaction. The temperature of the solution was maintained at about 60° C. by external cooling of the reaction vessel. Completion of the reaction was indicated by a drop in the temperature of the reaction mixture, and by a decrease in the intensity of its color. The reaction mixture thereafter was distilled under reduced pressure, the acetic acid distilling first, and a fraction consisting essentially of beta-acetoxypropionic acid distilling thereafter at 95° to 97° C. under a pressure of about 1 millimeter of mercury.

The beta-acetoxypropionic acid prepared in this experiment was found to be further characterized by a refractive index ($n_D^{22.5}$) of 1.4304 and a density ($d20/4$) of 1.210. It will be appreciated, of course, that minor variations in the observed constants, as well as in the observed range of distillation temperature, may be anticipated from one preparation to another of the foregoing compounds. Their physical constants as thus given, however, will serve as a basis for their identification and may be employed to distinguish the compounds further from other compounds heretofore known.

The method employed in the foregoing example for preparation of the beta-acetoxypropionaldehyde is more fully disclosed and is claimed in copending application Serial No. 728,962, filed February 15, 1947. For the purposes of the present invention, the beta-acetoxypropionaldehyde also may be prepared by any other suitable method. For example, an alternative method would be to react according to known processes a suitable salt of acetic acid, such as silver acetate, with a beta-halopropionaldehyde, such as beta-iodopropionaldehyde, to produce beta-acetoxypropionaldehyde. Other suitable methods also may be employed.

We claim as our invention:

1. A process for the preparation of beta-acetoxypropionic acid which comprises preparing a 35 to 60 per cent by weight solution of beta-acetoxypropionaldehyde in glacial acetic acid, containing from about 0.5 per cent to about 15 per cent by weight of the beta-acetoxypropionaldehyde of a cobalt chelate salt of a beta-diketone, aerating the solution at a temperature of from about 40° C. to about 70° C. with an oxygen-containing gas until reaction is substantially complete, and recovering beta-acetoxypropionic acid from the solution.

2. A process for the preparation of beta-acetoxypropionic acid which comprises preparing a 35 to 60 per cent by weight solution of beta-acetoxypropionaldehyde in glacial acetic acid, containing from about 0.5 to about 15 per cent by weight of cobalt acetylacetonate, aerating the solution at a temperature of from about 40° C. to about 70° C. with an oxygen-containing gas until reaction is substantially complete, and recovering beta-acetoxypropionic acid from the solution.

3. A process for the preparation of beta-acetoxypropionic acid by oxidation of beta-acetoxypropionaldehyde in liquid phase by the action of molecular oxygen in the presence of a catalyst whereby there is produced beta-acetoxypropionic acid, characterized in that there is employed as the catalyst a soluble cobalt chelate salt of a beta-diketone dissolved in the liquid reaction mixture.

4. A process for the preparation of beta-acetoxypropionic acid by oxidation of beta-acetoxypropionaldehyde in solution in acetic acid by the action of molecular oxygen in the presence of a catalyst, whereby there is produced beta-acetoxypropionic acid, characterized in that there is employed as the catalyst a solution of cobalt acetylacetonate dissolved in the reaction mixture.

5. A process for the preparation of beta-acetoxypropionic acid which comprises oxidizing beta-acetoxypropionaldehyde dissolved in a solvent therefor, by the action of molecular oxygen in the presence of a catalyst whereby there is produced beta-acetoxypropionic acid, characterized in that there is employed as the catalyst a cobalt chelate salt of an aliphatic beta-diketone.

6. A process for the preparation of beta-acetoxypropionic acid by oxidation in the liquid phase of beta-acetoxypropionaldehyde by the action of a molecular oxygen-containing gas catalyzed by the presence of a soluble cobalt chelate salt of a beta-diketone dissolved in said liquid phase.

SEAVER A. BALLARD.
BRADFORD P. GEYER.
ROBERT H. MORTIMER.

REFERENCES CITED

The following references are of record in the file of this patent:

UNITED STATES PATENTS

| Number | Name | Date |
|---|---|---|
| 2,000,604 | Malm et al. | May 7, 1935 |
| 2,287,537 | Shulz | June 23, 1946 |
| 2,399,595 | Filachione et al. | Apr. 30, 1946 |

OTHER REFERENCES

Nef. Ann. der Chem., vol. 335, p. 266 (1904).
Auger Compte Rendus, vol. 140, p. 938 (1905).
Anshutz Ann. der Chem., vol. 392, p. 106 (1912).
Shoruigin et al., Chem. Abstracts, vol. 29, column 7942 (1935).
Sherlin et al., Chem. Abstracts, vol. 32, column 5398 (1938).
Thomi, Svensk Kemisk Tidskrift, vol. 50, pp. 255–257 (1938).
Chovin Compte Rendus, vol. 212 pp. 797–800 (1941).